United States Patent
Yin et al.

(10) Patent No.: US 12,454,031 B2
(45) Date of Patent: Oct. 28, 2025

(54) MACHINING METHOD FOR HIGH-ASPECT-RATIO MODEL PART OF ULTRA-HIGH STRENGTH STEEL FOR WIND TUNNEL TEST

(71) Applicant: CHENGDU KAIDI SEIKO TECHNOLOGY CO., LTD., Chengdu (CN)

(72) Inventors: Guigang Yin, Chengdu (CN); Chuandong Wang, Chengdu (CN); Zhongmin Pei, Chengdu (CN)

(73) Assignee: CHENGDU KAIDI SEIKO TECHNOLOGY CO., LTD., Chengdu (CN)

( * ) Notice: Subject to any disclaimer, the term of this patent is extended or adjusted under 35 U.S.C. 154(b) by 936 days.

(21) Appl. No.: 17/665,839

(22) Filed: Feb. 7, 2022

(65) Prior Publication Data
US 2022/0410326 A1    Dec. 29, 2022

(30) Foreign Application Priority Data
Jun. 26, 2021    (CN) .......................... 202110715189.2

(51) Int. Cl.
| | |
|---|---|
| *B23P 15/00* | (2006.01) |
| *B23H 1/02* | (2006.01) |
| *B23P 23/04* | (2006.01) |
| *G01M 9/08* | (2006.01) |

(52) U.S. Cl.
CPC .............. *B23P 15/00* (2013.01); *B23H 1/022* (2013.01); *B23P 23/04* (2013.01); *G01M 9/08* (2013.01); *B23H 2600/12* (2013.01)

(58) Field of Classification Search
CPC ...... B23H 1/022; B23H 2600/12; B23H 7/02; B23H 9/10; B23H 1/02; B23P 15/00; B23P 23/04; B23P 13/02; B23P 25/003; B64C 3/00; B64F 5/60; G01M 9/08; Y10T 29/49996; B21J 1/06
See application file for complete search history.

(56) References Cited

U.S. PATENT DOCUMENTS

| | | | |
|---|---|---|---|
| 6,676,344 B1 * | 1/2004 | Amatt .............. | G05B 19/40931 409/80 |
| 9,745,081 B2 * | 8/2017 | Best ....................... | F16M 11/42 |
| 10,633,731 B2 * | 4/2020 | Bales .................... | F01D 5/3061 |

(Continued)

*Primary Examiner* — Edward F Landrum
*Assistant Examiner* — Adam M Eckardt
(74) *Attorney, Agent, or Firm* — Lando & Anastasi, LLP

(57) ABSTRACT

The present disclosure relates to the technical field of aerospace, and provides a machining method for high-aspect-ratio model part of ultra-high strength steel for wind tunnel test. The machining method includes the following steps: a) selecting a material; b) performing preliminary treatment, such as forging and solid solution heat treatment, on the material; c) performing rough milling to obtain a wing main body profile, process reference blocks, and grooves and holes with large sizes on a molded surface; d) performing finish milling on all machining features of a wing main body; e) removing all process reference blocks except the first process reference block; f) performing aging treatment when the wing main body is lifted; h) removing a process reference block at a wing main body root; and h) performing shaping treatment on the wing main body.

7 Claims, 4 Drawing Sheets

(56) References Cited

U.S. PATENT DOCUMENTS

| | | | |
|---|---|---|---|
| 11,708,764 B2 * | 7/2023 | Shimizu | B22F 3/225 |
| | | | 416/223 R |
| 2010/0252533 A1 * | 10/2010 | Mercier | B23H 11/003 |
| | | | 219/69.15 |

* cited by examiner

MACHINING METHOD FOR HIGH-ASPECT-RATIO MODEL PART OF ULTRA-HIGH STRENGTH STEEL FOR WIND TUNNEL TEST

CROSS REFERENCE TO RELATED APPLICATION(S)

This patent application claims the benefit and priority of Chinese Patent Application No. 202110715189.2, filed on Jun. 26, 2021, the disclosure of which is incorporated by reference herein in its entirety as part of the present application.

TECHNICAL FIELD

The present disclosure relates to the technical field of aerospace, and in particular, to a machining method for a high-aspect-ratio model part of ultra-high strength steel for a wind tunnel test.

BACKGROUND

With the rapid development of aerospace technology, the requirements for an aircraft range and a flight altitude are higher and higher. Unmanned aircrafts have become the focus of research of various countries in the world, and have made remarkable achievements. The research of high-altitude long-endurance aircrafts is an important development direction. The wings of such aircrafts mostly adopt a high-aspect-ratio structural configuration in design. FIG. 1 to FIG. 3 illustrate structural schematic diagrams of a certain high-aspect-ratio wing main body 1 at present. In the early research and development of aircraft, wind tunnel tests of various topics are a necessary way to obtain research data. In the early research and development of an aircraft, wind tunnel tests on vinous subjects are necessary ways to obtain research data. During the processes of various wind tunnel tests, such high-aspect-ratio wing main body bears large loads, have weak bending moment resistances, and poor rigidity, so it is particularly important to design and machine ultra-high strength steel and machine and manufacture a model wing part that meets the requirements of a wind tunnel test during machining and manufacturing of the wing of such wind tunnel model.

SUMMARY

An objective of the present disclosure is to provide a machining method for a high-aspect-ratio model part of ultra-high strength steel for wind tunnel test to solve the problems and disadvantages of the prior art.

An embodiment of the present disclosure is implemented by the following technical solution.

A machining method for high-aspect-ratio model part of ultra-high strength steel for wind tunnel test includes the following steps:

a) preparing an envelope material blank, where an overall profile of the envelope material blank is 1.0006 to 1.0009 times larger than that of an envelope of a three-dimensional mathematical model of a wing main body;

b) performing forging and solid solution heat treatment on the envelope material blank, and performing rough milling on the envelope material blank to obtain a rough blank;

c) performing rough machining on the rough blank to obtain a wing main body profile and process reference blocks on the wing main body, where the wing main body profile includes a wing root profile, a wing front edge profile, a wing rear edge inner aileron profile, and a wing rear edge outer aileron profile; the process reference blocks include a first process reference block arranged on the wing root profile, a second process reference block, a third process reference block, a fourth process reference block, a fifth process reference block and a sixth process reference block arranged along the wing front edge profile, a seventh process reference block and an eighth process reference block arranged along the wing rear edge inner aileron profile, a ninth process reference block, a tenth process reference block, and an eleventh process reference block arranged along the wing rear edge outer aileron profile, and a twelfth process reference block extending a molded surface of the wing main body and used for connecting the seventh process reference block, the eighth process reference block, the ninth process reference block, the tenth process reference block and the eleventh process reference block integrally; and two suspending holes are symmetrically formed in the first process reference block with respect to a centroid of the wing main body in a height direction of the envelope material blank;

d) performing further rough machining, in a manner of reserving a machining allowance of 1 mm in one side, on the molded surface to obtain grooves with a width of greater than 30 mm and holes with diameters of greater than 16 mm;

e) performing finish milling on all features on the molded surface of the wing main body in step 4);

f) removing all process reference blocks except the first process reference block;

g) freely suspending the wing main body through the two suspending holes in the first process reference block, and performing aging treatment on the wing main body;

h) removing the first process reference block based on the three-dimensional mathematical model of the wing main body, such that an overall profile of the wing main body is identical to that of the three-dimensional mathematical model of the wing main body; and i) performing deburring treatment on the wing main body.

Further, in step a), the envelope material blank is of a steel material with tensile strength ≥1700 MPa.

Further, in step b), a machining allowance of 10 mm is reserved on one side during forging.

Further, in step c), a geometrical tolerance and a dimensional tolerance of each side surface of each obtained process reference block are further ground by a grinding machine.

Further, in step f), a method for removing the process reference blocks is numerical control milling.

Further, in step f), a method for removing the process reference blocks is wire electrical discharge machining.

Further, in step i), the surface roughness of the wing main body after deburring treatment is 0.4 μm.

The technical solution of the present disclosure can have at least the following beneficial effects.

For improving the overall molded surface accuracy and surface roughness of the wing main body and reducing the deformation in the machining of wing parts, the present disclosure skillfully adopts solid solution heat treatment to homogenize internal lattices of the material and reduce the internal stress concentration of the material. The overall three-dimensional mathematical model is subjected to enlargement processing of 1.0006 to 1.0009 times. After the finish machining is completed, aging treatment is performed on enlarged part. At this time, the high-aspect-ratio wing will produce certain shrinkage, and a shrinkage amount can just reach the original data accuracy of a 1:1 wing. In combination with the arrangement of reasonable process reference blocks, the connecting strength and the machining stability during the machining of the wing main body are arranged, so as to machine a high-precision wing wind tunnel part that meets test requirements.

BRIEF DESCRIPTION OF THE DRAWINGS

In order to describe the technical solution of the embodiments of the present disclosure more clearly, accompanying drawings required to be used in the embodiments will be briefly introduced. It should be understood that the following accompanying drawings only show some embodiments of the present disclosure, so they should not be regarded as the limitation of the scope. For those of ordinary skill in the art, other related drawings may also be obtained according to these drawings without creative effort.

DETAILED DESCRIPTION

To make the objectives, technical solutions, and advantages of the embodiments of the present disclosure clearer, the following clearly and completely describes the technical solutions in the embodiments of the present disclosure with reference to the drawings in the embodiments of the present disclosure. The described embodiments are part rather than all of the embodiments of the present disclosure. Typically, the components of the embodiments of the present, which are described and shown in the accompanying drawings herein, may be arranged and designed in a variety of different configurations.

Therefore, the following detailed description of the embodiments of the present disclosure provided in the accompanying drawings is not intended to limit the scope of protection of the present disclosure, but only represents the selected embodiments of the present disclosure. On the basis of the embodiments of the present disclosure, all other embodiments obtained on the premise of no creative work of those of ordinary skill in the art fall within the scope of protection of the present disclosure.

Embodiment 1

The embodiment provides a machining method for high-aspect-ratio model part of ultra-high strength steel for wind tunnel test, specifically including the following steps.

A) Preparation work before machining is performed, the content of which mainly includes the following aspects.

A.1) A material is selected, that is, a material required for manufacturing a wing main body is selected according to a theoretical shape of the wing main body and a load on the wing main body during a wind tunnel test, and a high-strength steel material with $\delta b$ (the tensile strength of the material)$\geq 1700$ MPa is selected here.

A.2) A material layout during machining is determined. A material layout direction when a wing is manufactured is mainly designed according to the theoretical shape of the wing main body. The material layout reference edge is in the direction of a front edge of the wing. Such material layout solution may save material, reduce the material cost and the machining cost.

A.3) A machining route and position distribution of process reference blocks on the wing main body profile are determined.

Figure 1:
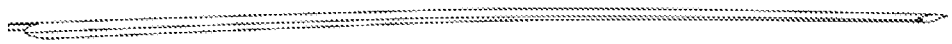
FIG. 1 illustrates a vertical view of a wing main body.
Figure 2:
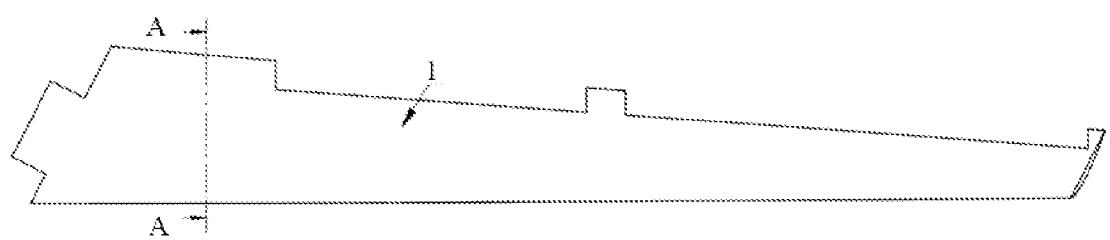
FIG. 2 illustrates a front view of the wing main body.
Figure 3:
FIG. 3 illustrates a sectional view of FIG. 2 in the A-A direction.
Figure 4:
FIG. 4 illustrates a front view of distribution of process reference blocks of the wing main body during machining.
Figure 5:
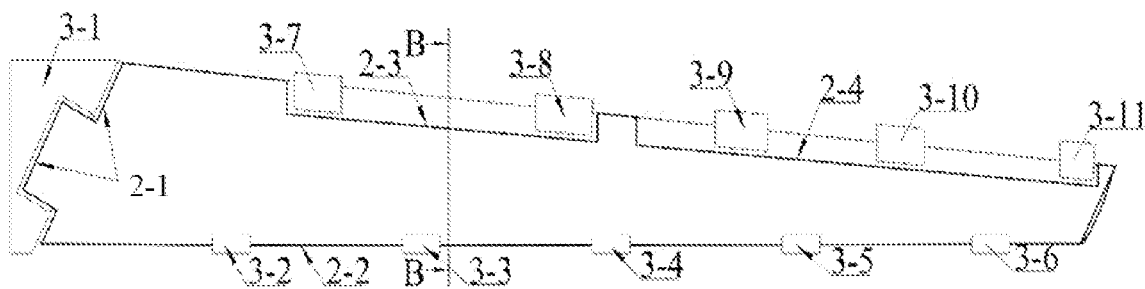
FIG. 5 illustrates a vertical view of distribution of process reference blocks of the wing main body during machining.
Figure 6:
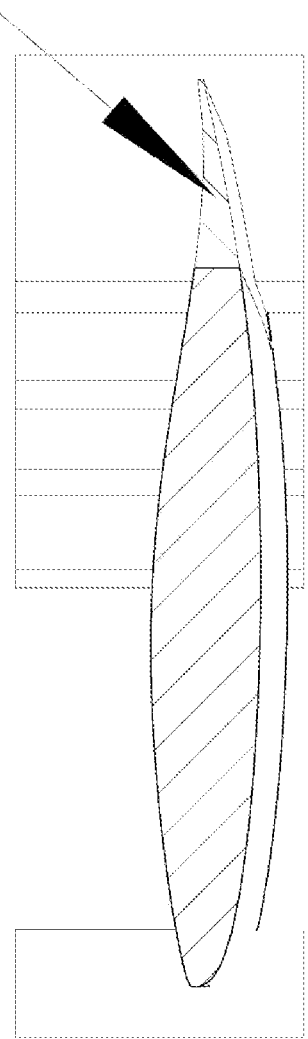
FIG. 6 illustrates a sectional view of FIG. 5 in the B-B direction.

The positions of the process reference blocks follow the basic principles that clamping is facilitated, a machining area is open (less occlusion), the process reference blocks are placed uniformly, and the rigidity of each process reference block is less than that of the wing main body. Referring to FIG. 4 to FIG. 6, the wing main body profile includes a wing root profile 2-1, a wing front edge profile 2-2, a wing rear edge inner aileron profile 2-3, and a wing rear edge outer aileron profile 2-4. These theoretical contour lines with important characteristics play an important role in the placement position design and machining guarantee of subsequent process reference blocks.

The process reference blocks include a first process reference block 3-1 arranged on the wing root profile 2-1, a second process reference block 3-2, a third process reference block 3-3, a fourth process reference block 3-4, a fifth process reference block 3-5 and a sixth process reference block 3-6 arranged along the wing front edge profile 2-2, a seventh process reference block 3-7 and an eighth process reference block 3-8 arranged along the wing rear edge inner aileron profile 2-3, a ninth process reference block 3-9, a tenth process reference block 3-10 and an eleventh process reference block 3-11 arranged along the wing rear edge outer aileron profile 2-4, and a twelfth process reference block 3-12 extending a molded surface of the wing main body 1 and used for connecting the seventh process reference block 3-7, the eighth process reference block 3-8, the ninth process reference block 3-9, the tenth process reference block 3-10 and the eleventh process reference block 3-11 integrally. Among these process reference blocks, the first process reference block 3-1 is connected with the wing body root profile 2-1, so as to ensure the connecting strength and the machining stability at the root of the wing main body during wing machining. The second process reference block 3-2, the third process reference block 3-3, the fourth process reference block 3-4, the fifth process reference block 3-5, and the sixth process reference block 3-6 ensure the connecting strength and the machining stability at the front edge of the wing main body during machining, and also have an effect of straightening and aligning the overall part during machining. The positions of the seventh process reference block 3-7, the eighth process reference block 3-8, the ninth process reference block 3-9, the tenth process reference block 3-10, and the eleventh process reference block 3-11 skillfully make use of neutral spaces of a wing inner aileron and a wing outer aileron to ensure the connecting strength and the stability during machining. The distance between adjacent process reference blocks is preferably ensured to be between 200 mm and 350 mm. The twelfth process reference block 3-12 extends along the molded surface of the wing main body, so that the seventh process reference block 3-7, the eighth process reference block 3-8, the ninth process reference block 3-9, the tenth process reference block 3-10, and the eleventh process reference block 3-11 are connected integrally, which further enhances the machining rigidity, and reduces the machining deformation produced during machining.

Figure 8:
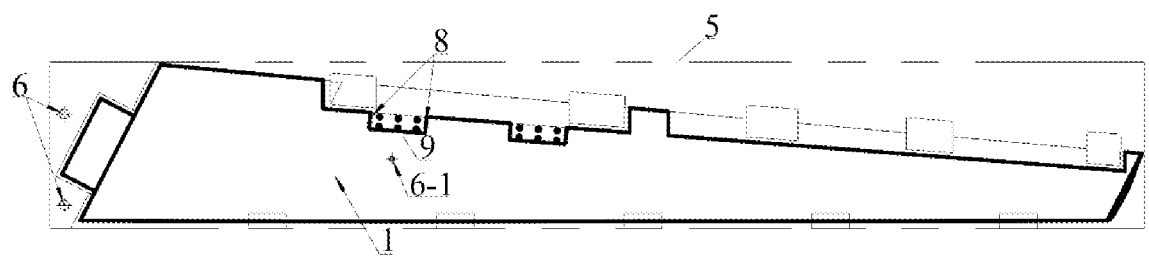
FIG. 8 illustrates a schematic diagram of a change of the wing main body during machining.

In addition, referring to FIG. 8, two suspending holes 6 are symmetrically formed in the first process reference block 3-1 with respect to a centroid 6-1 of the wing main body 1 in a height direction of the envelope material blank.

Figure 7:
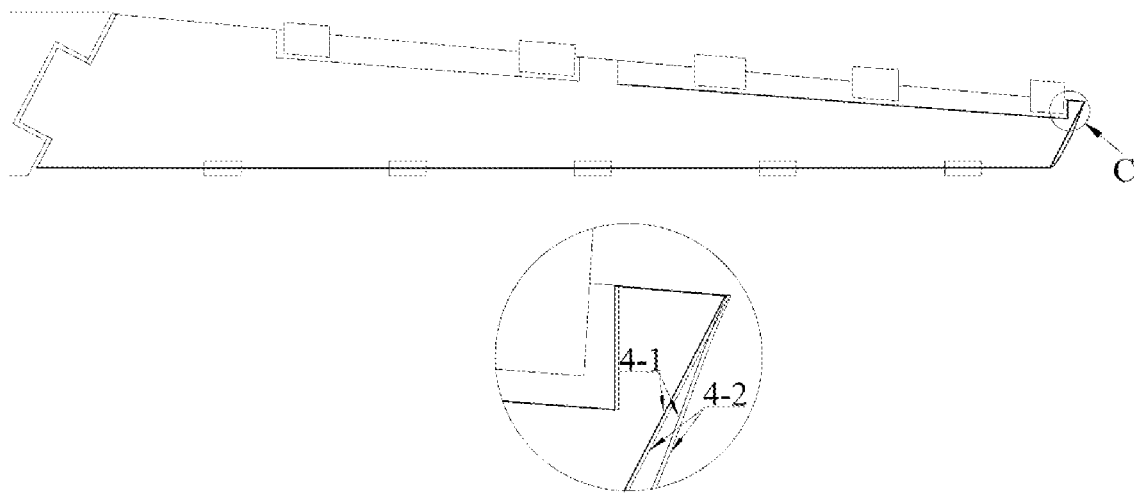
FIG. 7 illustrates a schematic diagram of the wing main body of 1:1 scale and a wing tip of the wing main body of enlarged scale.

B) An envelope material blank is prepared by integrating relevant factors of the wing main body, the process reference blocks, and the machining allowance left in a rough machining process. The overall profile of the envelope material blank is 1.0006 to 1.0009 times larger than that of an envelope of a three-dimensional mathematical model of the wing main body 1, as shown in FIG. 7, in which 4-1 is the actual size of the wing tip of the wing main body to be produced actually, and 4-2 is the size of the wing tip of the enlarged wing main body. In this way, the adoption of the enlarged wing machining is used to compensate the shrinkage generated during aging treatment and provide allowance compensation for a machining process.

C) Preliminary treatment of the envelope material blank specifically includes the following.

C.1) The envelope material blank is forged. A forged envelope material blank is required to have no defects, such as slag inclusion, a crack, a wrinkle, or an air hole. To consider the overall machining cost of a part, a machining allowance of about 10 mm may be left on one side during forging.

C.2) Solid fusion heat treatment is performed on the forged envelope material blank, so that crystal grains inside the forged envelope material blank are refined and homogenized to release internal stress generated by forging, thereby early-stage bedding preparation is made for controlling the deformation of the forged envelope material blank during subsequent machining.

C.3) The forged envelope material blank is squared, and the forged envelope material blank is milled to obtain a required rough blank.

C.4) Ultrasonic flaw detection is performed on a squared rough blank according to corresponding non-destructive testing standards, level I standard is required to be qualified to ensure that the rough blank does not have a material defect, and the quality of the part is controlled in a material preparation stage.

D) Rough machining is performed on the forged envelope material blank. Specifically, referring to FIG. 8, first, profile material layout processing is performed on the envelope material blank 5 according a material layout solution in advance, and then, the wing main body profile and the process reference blocks at various positions are milled. Thus, an unnecessary large allowance is removed first, and the deformation of the part during machining may be controlled well. Rough machining of the molded surface is performed after the profile material layout is completed. During rough machining, feature sizes, such as various grooves with the widths greater than 30 mm and holes with the diameters of greater than 16 mm, need to be machined. The machining allowance of 1 mm needs to be left on one side of all machining features to retain materials. Thus, stress concentration of the part during machining may be fully released, which facilitates eliminating the deformation of the part in subsequent process.

E) Both surfaces of the thickness, straight section surfaces of the front edges, and reference straight section surfaces at side ends of the process reference blocks of the parts are machined by using a grinding machine, so as to eliminate machining deformation produced in previous processes and ensure the geometrical tolerance and the dimensional tolerance of the parallelism, the perpendicularity, and the flatness of various references.

F) The wing main body obtained in step E) is subjected to finish machining. Specifically, referring to FIG. 8, numerical control milling finish machining is performed on all molded surfaces on the wing main body 1. When the molded surfaces are subjected to finish machining, a grinding and polishing allowance of 0.05 mm is reserved, all aileron mounting grooves 8 (the aileron mounting grooves 8 being inward concave grooves) on the wing main body are subjected to finish machining, groove bottom mounting surfaces are machined at a zero position, the grinding and polishing allowance is not reserved, and the side surfaces of the grooves are machined according to a one-side allowance greater than 0.02 mm. Structural features of all aileron mounting holes 9 and the like on the wing main body are machined.

G) All process reference blocks except the first process reference block are milled off through numerical control machining.

H) Two suspending holes 6 in the first process reference block 3-1 at the wing main body root are hung by using suspending rings. All other places are suspended freely. Aging is performed on the part by using a well type heat treatment furnace. Free suspension through the center of gravity of the part can reduce the deformation of the part during heat treatment, and the aging treatment can improve the tensile strength of the material of the part.

I) The first process reference block 3-1 at the wing main body root is removed in a wire electrical discharge machining manner based on the three-dimensional mathematical model of the wing main body, such that an overall profile of the wing main body is identical to that of the three-dimensional mathematical model of the wing main body.

J) Shaping treatment and deburring treatment are performed on the wing main body, and the surface roughness after the wing main body is shaped is 0.4 μm.

It can be known from the above content that, starting from the problems about improving the overall molded surface accuracy and surface roughness of the wing main body and reducing the deformation in the machining of wing parts, the present disclosure skillfully adopts solid solution heat treatment to homogenize internal lattices of the material and reduce the internal stress concentration of the material. The overall 1:1 three-dimensional mathematical model is subjected to enlargement processing, and the enlargement is performed according to the magnification of 1.0006 to 1.0009. After the finish machining is completed, aging treatment is performed on enlarged part. At this time, the high-aspect-ratio wing will produce certain shrinkage, and a shrinkage amount can just reach the original data accuracy of a 1:1 wing. In combination with the arrangement of reasonable process reference blocks, the connecting strength and the machining stability during the machining of the wing main body are arranged, so as to machine a high-precision wing wind tunnel part that meets test requirements.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

The invention claimed is:

1. A machining method for a high-aspect-ratio wind model part of ultra-high strength steel for a wind tunnel test, comprising the following steps:
   a) preparing an envelope material blank, wherein an overall profile of the envelope material blank is 1.0006 to 1.0009 times larger than that of an envelope of based on a three-dimensional mathematical model of a wing main body;
   b) performing forging and solid solution heat treatment on the envelope material blank, and performing rough milling on the envelope material blank to obtain a rough blank;
   c) performing rough machining on the rough blank to obtain a wing main body profile and process reference blocks on the wing main body, wherein the wing main body profile comprises a wing root profile, a wing front edge profile, a wing rear edge inner aileron profile, and a wing rear edge outer aileron profile; the process reference blocks comprise a first process reference block arranged on the wing root profile, a second process reference block, a third process reference block, a fourth process reference block, a fifth process reference block, and a sixth process reference block arranged along the wing front edge profile, a seventh process reference block and an eighth process reference block arranged along the wing rear edge inner aileron profile, a ninth process reference block, a tenth process reference block, and an eleventh process reference block arranged along the wing rear edge outer aileron profile, and a twelfth process reference block extending a molded surface of the wing main body and used for connecting the seventh process reference block, the eighth process reference block, the ninth process reference block, the tenth process reference block and the eleventh process reference block integrally; and two suspending holes are symmetrically formed in the first process reference block with respect to a centroid of the wing main body in a height direction of the envelope material blank;
   d) performing further rough machining, in a manner of reserving a machining allowance of 1 mm in one side, on the molded surface to obtain grooves with a width of greater than 30 mm and holes with diameters of greater than 16 mm;
   e) performing finish milling on all features on the molded surface of the wing main body in step d);
   f) removing all process reference blocks except the first process reference block;
   g) freely suspending the wing main body through the two suspending holes in the first process reference block, and performing aging treatment on the wing main body;
   h) removing the first process reference block based on the three-dimensional mathematical model of the wing main body, such that the overall profile of the wing main body is identical to that of the three-dimensional mathematical model of the wing main body; and
   i) performing and deburring treatment on the wing main body,
   wherein the rough machining relating to obtaining the wing main body profile in step c), the further rough machining in step d) and the finish milling in step e) are performed based on the three-dimensional mathematical model of the wing main body, such that an overall profile of the wing main body obtained after step e) is 1.0006 to 1.0009 times larger than that of the three-dimensional mathematical model of the wing main body.

2. The method according to claim 1, wherein in step a), the envelope material blank is of a steel material with a tensile strength ≥1700 MPa.

3. The method according to claim 1, wherein in step b), a machining allowance of 10 mm is reserved on one side during forging.

4. The method according to claim 1, wherein in step c), a geometrical tolerance and a dimensional tolerance of each side surface of each obtained process reference block are further ground by a grinding machine.

5. The method according to claim 1, wherein in step f), a method for removing the process reference blocks comprises numerical control milling.

6. The method according to claim 1, wherein in step f), a method for removing the process reference blocks comprises wire electrical discharge machining.

7. The method according to claim 1, wherein in step i), a surface roughness of the wing main body after deburring treatment is 0.4 μm.

* * * * *